United States Patent [19]
Yamanashi et al.

[11] Patent Number: 5,572,106
[45] Date of Patent: Nov. 5, 1996

[54] MOTOR DRIVING APPARATUS

[75] Inventors: Motoaki Yamanashi, Nagoya; Yoshiaki Komatsu, Yokkaichi, both of Japan

[73] Assignee: Brother Kogyo Kabushiki Kaisha, Nagoya, Japan

[21] Appl. No.: 415,501

[22] Filed: Apr. 3, 1995

[30] Foreign Application Priority Data

Apr. 6, 1994 [JP] Japan ..................... 4-068607

[51] Int. Cl.$^6$ ........................... H02K 23/64; H02P 3/18
[52] U.S. Cl. .................. 318/803; 318/245; 318/254; 318/810; 388/812
[58] Field of Search .................... 318/812, 813, 318/801, 799, 811, 599, 254, 138, 439, 800, 803, 245, 810; 388/812, 813

[56] References Cited

U.S. PATENT DOCUMENTS

| | | | |
|---|---|---|---|
| 3,593,112 | 7/1971 | Coats et al. ............... | 323/24 |
| 3,710,215 | 1/1973 | Johnston .................. | 318/798 |
| 4,329,630 | 5/1982 | Park ....................... | 318/293 |
| 4,935,691 | 6/1990 | Lamar ..................... | 323/323 |

*Primary Examiner*—John W. Cabeca
*Attorney, Agent, or Firm*—Oliff & Berridge

[57] ABSTRACT

An apparatus for driving an electric motor according to a given control target, including a control circuit which generates a control command signal corresponding to the control target, a chopping signal generator which generates a chopping signal based on the control command signal generated by the control circuit, a full-wave rectifier which rectifies an alternating current supplied from an alternating-current power supply, and supplies a full-wave rectified current to the motor, and a chopper which is connected in series to a series circuit including the motor and the full-wave rectifier and which chops the full-wave rectified current supplied to the motor according to the chopping signal generated by the chopping signal generator.

11 Claims, 6 Drawing Sheets

(α)  (α)

MOTOR DRIVING APPARATUS

BACKGROUND OF THE INVENTION

1. Field of the Invention

The present invention relates to a driving apparatus for driving an electric motor according to a given control target.

2. Related Art Statement.

A sewing machine performs a sewing operation by converting rotary motion of an electric motor into vertical motion of a needle bar to which a sewing needle is secured, vertical motion of an upper(needle)-thread take-up lever with different operation timing than that of the vertical motion of the needle bar, rotary rotation of a shuttle in which a lower thread is accommodated, X—Y feeding of a work sheet such as a cloth or leather relative to the needle (or needle bar), etc. The electric motor employed in the sewing machine is, e.g., a universal motor. FIG. 4 shows a conventional driving apparatus for driving a universal motor 4. A driving apparatus employed in a sewing machine is an example of the motor driving apparatus to which the present invention relates.

As shown in FIG. 4, a universal motor (M) 4 is connected to a commercially available AC (alternating current) power supply 1 via a noise-removing circuit 2 and a solid-state relay (SSR) 3. Each of the rotor and stator of the universal motor 4 is formed of a coil. The AC source voltage of the AC power supply 1 is directly applied to the universal motor 4, so that the rotor of the motor 4 rotates in one direction irrespective of the changing of flow directions of the electric current flowing through the motor 4. FIG. 5(A) shows a waveform of the AC source voltage of the AC power supply 1.

A central processing unit (CPU) 5 is connected to the solid-state relay 3. A target-speed volume 6 and a rotary encoder 7 are connected to the CPU 5. The volume 6 is manually operable by an operator or user to input or preset a desired target rotation speed of the universal motor 4. The encoder 7 detects an actual rotation speed of the motor 4. The CPU 5 compares the actual motor speed detected by the encoder 7, with the target motor speed preset through the volume 6, and produces a control command signal based on the comparison result. The CPU 5 utilizes the control command signal for determining a timing to supply an ON signal to the solid-state relay 3. FIG. 5(B) shows the ON signals which the CPU 5 supplies to the relay 3. Upon reception of each ON signal, the relay 3 permits a portion of the voltage waveform of the AC supply 1 shown in FIG. 5(A) to pass therethrough to the universal motor 4, so as to rotate the motor 4. This "portion" of the AC voltage waveform starts with a phase angle upon reception of each ON signal and ends with the following zero crossing.

The CPU 5 modifies the control command signal and changes the timing of supplying of an ON signal so that the actual motor speed detected by the encoder 7 gradually approaches the target motor speed preset via the volume 6. For example, in the case where the actual motor speed measured by the encoder 7 is lower than the target motor speed input through the volume 6, the CPU 5 shifts the timing of supplying of an ON signal to the relay 3, leftward as seen in FIG. 5(B), that is, generates an ON signal at a shorter interval. Consequently, a greater portion of the AC voltage waveform is supplied to the universal motor 4, so that the rotation speed of the motor 4 is accelerated.

The voltage waveform of the AC supply 1 shown in FIG. 5(A) oscillates at 50 Hz or 60 Hz, therefore the universal motor 4 rotates at a frequency of 100 Hz or 120 Hz as shown in FIG. 5(B) or FIG. 5(C). FIG. 5(D) shows a waveform of an electric current flowing through the motor 4. Meanwhile, the output torque of a DC (direct current) motor changes in proportion to the magnitude of electric current flowing through the DC motor. In particular, the output torque of a universal motor 4 changes in proportion to the square of electric current flowing therethrough. FIG. 5(E) shows the change of output torque, Γ, of the universal motor 4 with respect to time, t.

However, the conventional motor driving apparatus arranged as described above suffers from the problems that the universal motor 4 intermittently generates output torque peaks Γ as shown in FIG. 5(E) and that the respective maximum values of the intermittent output torque peaks Γ are not constant or uniform. Consequently the motor 4 produces vibration having a frequency of 100 Hz or 120 Hz. This vibration of the motor 4 causes discomfort vibration of the framework of the sewing machine which in turn is transmitted to the operator or user. Additionally, since the 100 Hz or 120 Hz vibration falls within the human audible sound range, the operator or user cannot avoid hearing discomfort low-tone noise resulting from that vibration. A test shows that a home-use or domestic portable sewing machine produces noise as high as 57 dB when a universal motor employed therein is rotated at 110 rpm (rotations per minute).

In this background, it may be considered that the above problems may possibly be solved by the following methods: the first method is to employ a vibration absorber such as a rubber member and the second method is to drive a universal motor with a direct current supplied from an exclusive DC power supply. However, the first method does not fundamentally eliminate the cause of the vibration, therefore cannot sufficiently reduce either the vibration or the noise. In addition, since the vibration absorber is expensive, the production cost of the sewing machine is much increased. In the second method, a considerably large DC power supply is needed for driving a universal motor. This also increases the production cost of the driving apparatus. In addition, it may be required that a heavy and bulky element such as a transformer be incorporated into the driving apparatus. In either case, the sewing machine cannot satisfy commercial requirements on either size or price.

In the conventional sewing machine of FIG. 4 having the universal motor 4 and the control apparatus for the motor 4, the rotary motion of the motor 4 is utilized for responding to not only constant load changing such as vertical reciprocation of a needle bar, but also abrupt load changing such as taking up of a needle thread by the needle-thread take-up lever. However, it is difficult to effectively follow each load changing at a control timing or frequency of 100 Hz or 120 Hz. Thus, the conventional driving apparatus suffers from the problems of delayed response to the load changing and resultant ineffective control of the motor rotation speed.

FIG. 6 shows another conventional driving apparatus for a DC motor 8. In this driving apparatus, a rectifying element 9 is provided between a noise removing circuit 2 and the DC motor 8. A CPU 5 controls the phase of full-wave rectified output of the rectifier 9, thereby driving the DC motor 9. However, the second driving apparatus suffers from the same problems as those with the above described, first driving apparatus.

SUMMARY OF THE INVENTION

It is therefore an object of the present invention to provide a driving apparatus for driving an electric motor, which apparatus does not employ an exclusive DC power supply or a vibration absorber and which sufficiently reduces the generation of uncomfortable vibration or noise.

The above object has been achieved by the present invention. According to the present invention, there is provided an apparatus for driving an electric motor according to a given control target, comprising a control circuit which generates a control command signal corresponding to the control target, a chopping signal generator which generates a chopping signal based on the control command signal generated by the control circuit, a full-wave rectifier which rectifies an alternating current supplied from an alternating-current power supply, and supplies a full-wave rectified current to the motor, and a chopper which is connected in series to a series circuit including the motor and the full-wave rectifier and which chops the full-wave rectified current supplied to the motor according to the chopping signal generated by the chopping signal generator.

In the motor driving apparatus constructed as described above, the control circuit generates a control command signal corresponding to a given control target, e.g., a selected target rotation speed of the motor preset through user's operation of an input device such as a target-speed volume. The chopping signal generator generates a chopping signal based on the control command signal. The full-wave rectifier rectifies an alternating current supplied from an alternating-current power supply, and supplies a full-wave rectified current to the motor, and the chopper chops the full-wave rectified current supplied to the motor, according to the chopping signal generated by the chopping signal generator. Therefore, since the chopping signal has a high frequency, the full-wave rectified current is chopped or switched at the high frequency, and the high frequency-chopped current or voltage is applied to the motor. Thus, the motor produces a continuous and considerably constant output torque, thereby reducing the generation of vibration and/or noise.

In a preferred embodiment of the present invention, the motor driving apparatus further comprises an insulator-type signal transmitter which transmits the chopping signal generated by the chopping signal generator, to the chopper, in a state in which the chopping signal generator is electrically insulated from the chopper. The insulator-type signal transmitter may comprise a photocoupler including a light emitting diode connected to the chopping signal generator, and a phototransistor connected to the chopper. The insulator-type signal transmitter effectively prevents an electric-short hazard from taking place between the chopping signal generator and the chopper.

According to a preferred feature of the present invention, the motor driving apparatus further comprises supply terminals which are connectable to the alternating-current power supply; a transformer which has input terminals connected to the supply terminals, respectively, and transforms the alternating current of the alternating-current power supply, into a transformed current, the transformer having output terminals and supplying, via the output terminals thereof, the transformed current to the control circuit and the chopping signal generator; and a ground (GND) line connected to one of the output terminals of the transformer, the ground line being earthed, the full-wave rectifier being directly connected to the supply terminals without any transformer being provided therebetween. This ground line may be connected to a framework of a machine or device in which the electric motor and the driving apparatus therefor are accommodated, and may be earthed via the framework. Another ground (GND) line may be connected to one of the supply terminals, and this ground line may also be earthed. In the latter case, the first ground line serves as a ground line for a primary side of the machine, whereas the second ground line serves as a ground line for a secondary side of the same on which the control circuit and the chopping signal generator are provided.

According to a preferred feature of the present invention, the chopping signal generator comprises means for generating the chopping signal having a frequency not lower than 10 KHz. The chopping signal generator may comprise means for generating the chopping signal having a frequency of about 20 KHz. For example, the frequency of the chopping signal preferably falls within the range of 16 to 24 KHz, more preferably within the range of 17 to 23 KHz, and most preferably within the range of 19 to 22 KHz. Since the chopped electric current flowing through the motor has a frequency component resulting from the chopping signal, it is preferred that a chopping signal having as high as possible a frequency be used to minimize the generation of vibration or noise from the motor. However, if the frequency of the chopping signal is excessively increased, the chopping capability of the chopper may not follow such a highly frequent switching or chopping. A test shows that the not less than 10 KHz frequency of the chopping signal suffices for the mechanical construction of a common sewing machine. In addition, since the about 20 KHz frequency noise is higher than the upper limit of the human audible sound range, the user or operator is more effectively prevented from hearing the discomfort noise generated from the motor.

According to another feature of the present invention, the motor driving apparatus further comprises supply terminals which are connectable to the alternating-current power supply, the full-wave rectifier has output terminals one of which provides a first ground (GND) line, and the chopper comprises (a) a direct-current power source which includes a first transformer having input terminals connected to the supply terminals, respectively, transforms the alternating current of the alternating-current power supply into a first transformed current, and produces a direct current from the first transformed current, the direct-current power source having output terminals and outputting the direct current via the output terminals thereof, one of the output terminals providing a second ground (GND) line connected to the first ground line of the full-wave rectifier, (b) a direct-current control circuit which causes the direct current from the direct-current power source to change between a high voltage state thereof and a low voltage state thereof according to the chopping signal supplied from the chopping signal generator via the insulator-type signal transmitter provided between the chopping signal generator and the direct-current control circuit, and (c) a chopping element which is connected in series to a series circuit including the motor and the full-wave rectifier and which is selectively placed in an ON state thereof and an OFF state thereof according to the direct current which changes between the high and low voltage states thereof under control of the direct-current control circuit.

According to yet another feature of the present invention, the chopping signal generator comprises a second transformer which has input terminals connected to the supply terminals, respectively, and output terminals, the second transformer transforming the alternating current of the alternating-current power supply into a second transformed current, and outputting the second transformed current via the output terminals thereof; a computer which is supplied with the second transformed current from the second transformer and which operates on a voltage of the second transformed current; and a ground (GND) line connected to one of the output terminals of the second transformer, the ground line being earthed, the full-wave rectifier being directly connected to the supply terminals without any transformer being provided therebetween.

According to the present invention, there is also provided an apparatus for driving an electric motor according to a given control target, comprising a full-wave rectifier which rectifies an alternating current supplied from an alternating-current power supply, and supplies a full-wave rectified current to the motor, a direct-current power supply which produces a direct current from the alternating current supplied from the alternating-current power supply, a chopper which is supplied with the direct current from the direct-current power source, a control circuit which generates a control command signal based on the control target, a chopping signal generator which generates a chopping signal based on the control command signal generated by the control circuit, and an insulator-type signal transmitter which transmits the chopping signal generated by the chopping signal generator, to the chopper, in a state in which the chopping signal generator is electrically insulated from the chopper, so that the chopper chops the full-wave rectified current supplied to the motor according to the chopping signal transmitted by the signal transmitter.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings in which.

DETAILED DESCRIPTION OF THE PREFERRED EMBODIMENTS

By reference to FIG. 1, FIGS. 2(A) to 2(G), and FIG. 3, there will be described a driving apparatus 10 for driving an electric motor 19 employed in a sewing machine. The driving apparatus 19 embodies the present invention.

Figure 1:
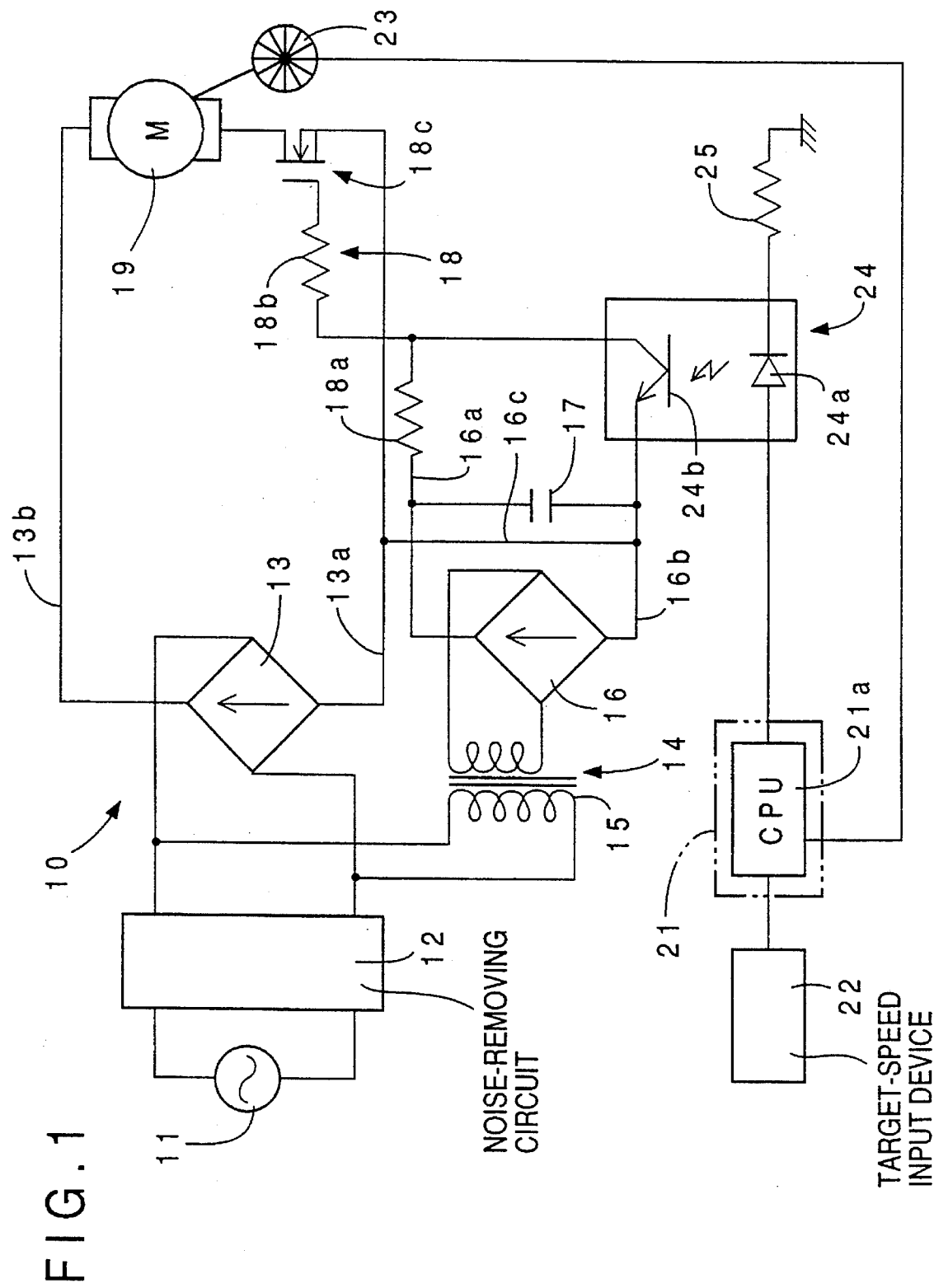
FIG. 1 is a diagrammatic view of a driving apparatus embodying the present invention.
Figure 2:
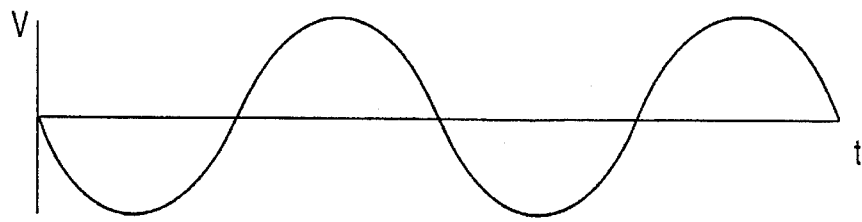
FIG. 2(A) is a graph showing a voltage waveform of an AC output of a commercially available AC power supply of the apparatus of FIG. 1.
FIG. 2(B) is a graph showing a voltage waveform of a full-wave rectified output of a rectifying element of the apparatus of FIG. 1.
FIG. 2(C) is a graph showing a control command signal produced by a control device of the apparatus of FIG. 1.
FIG. 2(D) is graph showing a control signal having a chopping frequency produced by the control device of the apparatus of FIG. 1.
FIG. 2(E) is a graph showing a chopping signal produced by the control device of the apparatus of FIG. 1.
FIG. 2(F) is a graph showing a voltage waveform obtained at a chopper of the apparatus of FIG. 1.
FIG. 2(G) is a graph showing an electric current flowing through an electric motor driven by the apparatus of FIG. 1, and an output torque of the electric motor.
Figure 2:
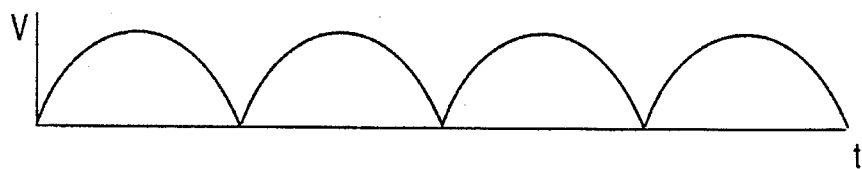
Figure 2:
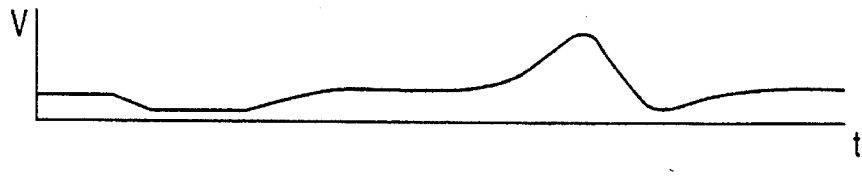
Figure 2:
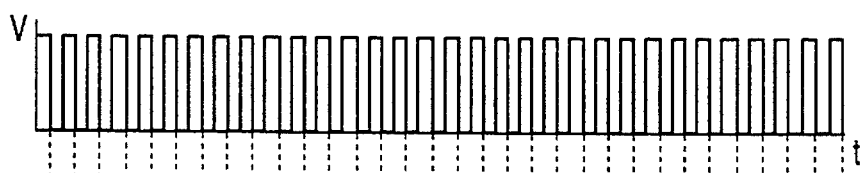
Figure 2:
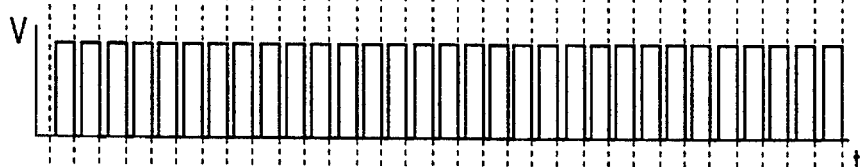
Figure 2:
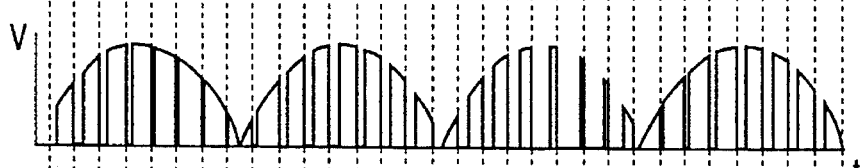
Figure 2:
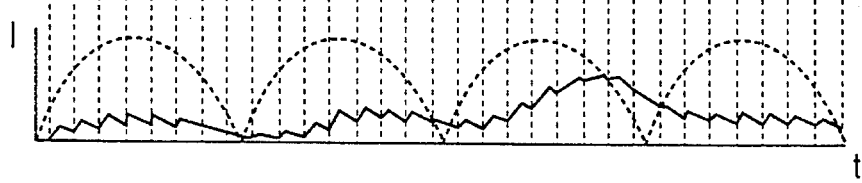

In FIG. 1, reference numeral 11 designates a commercially available 100 V (volt) AC (alternating current) power supply. A noise-removing circuit 12 and a first rectifying element 13 are connected to the AC supply 11. The first rectifier 13 full-wave rectifies a voltage waveform of an AC output of the AC supply 11, as shown in FIG. 2(A), to provide a full-wave rectified output as shown in FIG. 2(B). In the present embodiment, the first rectifier 13 functions as a full-wave rectifier of the driving apparatus in accordance with the present invention.

A stable DC (direct current) power source 14 is connected to the AC supply 11. The DC source 14 includes a transformer 15, a second rectifying element 16, and a smoothing condenser 17. The transformer 15 reduces the AC voltage of the AC supply 11, and the second rectifier 16 and the smoothing condenser 17 cooperate with each other to convert the thus reduced AC voltage into a stable DC voltage always higher by 5 V than the full-wave rectified output of the first rectifier 13. A pull-up resistance 18a and a resistance 18b are connected to a positive line 16a of the second rectifier 16, and a negative line (i.e., ground, GND) 16b of the second rectifier 16 is connected via a bypass line 16c to a negative line (i.e., ground GND) 13a of the first rectifier 13.

A chopping element 18c and an electric motor 19 are connected in series to the negative line 13a and a positive line 13b of the first rectifier 13. The chopping element 18c is a power MOS-FET (metal-oxide semiconductor field-effect-transistor). The electric motor 19 is a universal motor. A gate, G, of the chopping element 18c is supplied with the stable 5 V DC voltage from the DC source 14, via the following path (A):

positive line 16a>>pull-up resistance 18a>> resistance 18b>>chopping element 18c>> negative line 13a>>by-pass line 16c>> negative line 16b . . . (A)

The chopping element 18c cooperates with the pull-up resistance 18a and the resistance 18b to provide a chopper 18 of the driving apparatus of the present invention. When the 5 V DC voltage is applied to the chopper 18, the chopper 18 chops the full-wave rectified output of the first rectifier 13, as described later.

A control device 21 controls a series of operations of the sewing machine relating to the sewing of a work sheet such as a cloth or leather. The control device 21 includes a microcomputer comprised of a central processing unit (CPU) 21a, a read only memory (ROM), and a random access memory (RAM). A target-speed input device 22 and a speed sensor 23 are connected to the CPU 21a of the control device 21. The input device 22 includes a speed-command volume or dial (not shown) which is manually operable by an operator or user to input a desired target rotation speed of the electric motor 19. The speed sensor 23 includes a rotary encoder which detects an actual or current rotation speed of the electric motor 19. The CPU 21a compares the current speed detected by the speed sensor 23, with the target speed preset through the input device 22 and, based on the comparison result, the CPU 21a generates a control command signal to reduce the difference of the two speeds. FIG. 2(C) shows the control command signal generated by the CPU 21a. Thus, the CPU 21a functions as a control circuit of the driving apparatus of the present invention.

The CPU 21a has a clock which generates a clock signal, and modifies the clock signal, by frequency division, to provide a frequency-divided output having a 20 KHz chopping frequency as shown in FIG. 2(D). The CPU 21a generates a chopping signal based on the control command signal shown in FIG. 2(C) and the CF (chopping frequency) signal having the chopping frequency shown in FIG. 2(D). FIG. 2(E) shows the chopping signal generated by the CPU 21a. The greater the magnitude (V) of the control command signal of FIG. 2(C) is, the longer time the low-voltage state of the chopping signal of FIG. 2(E) lasts following the commencement of each low-voltage state of the CF signal of FIG. 2(D). Conversely, the smaller the magnitude of the control command signal is, the shorter time the low-voltage state of the chopping signal lasts following the commencement of each low-voltage state of the CF signal. Thus, the CPU 21a also functions as a chopping-signal generator of the driving apparatus of the present invention.

As shown in FIG. 1, the chopper 18 and the control device 21 are electrically insulated from each other, and are connected to each other by a photocoupler 24 which includes a light emitting diode (LED) 24a connected to the CPU 21a. An electric-current control resistance 25 is also connected to the CPU 21a via the LED 24a of the photocoupler 24. The photocoupler 24 additionally includes a phototransistor 24b whose emitter is connected to the negative line 16b of the second rectifier 16 and whose collector is connected to the gate G of the chopping element 18c via the resistance 18b. When the chopping signal of FIG. 2(E) takes a low-voltage state, the LED 24a stops emitting light, so that the phototransistor 24b inhibits an electric current from flowing therethrough. Consequently the 5 V direct current produced by the DC source 14 is applied to the gate G of the chopping element 18c through the previously mentioned path (A).

On the other hand, when the chopping signal of FIG. 2(E) takes a high-voltage state, the LED 24a emits light so that the phototransistor 24b permits an electric current to flow therethrough. Consequently the 5 V direct current being applied to the gate G of the chopping element 18c is reduced to zero V. The phototransistor 24b is selectively placed in a first operation state in which the transistor 24b shuts off the electric current flowing therethrough, and in a second operation state in which the transistor 24b conducts the electric current. Thus, the phototransistor 24b of the photocoupler 24 is selectively placed in the first or second operation state so as to transmit the chopping signal of FIG. 2(E) from the control device 21 or CPU 21a to the chopper 18 which is electrically insulated from the control device 21. The photocoupler 24 functions as an insulator-type signal transmitter of the driving apparatus of the present invention.

The amount or rate of light emission of the LED 24a depends on an electric current, IF, supplied thereto, and the electric current IF is defined according to the following expression:

$$IF = (E - VF)/R$$

where E is a higher voltage of the output signal of the CPU 21a,

VF is a voltage drop at the LED 24a, and

R is a resistance value of the control resistance 25.

Therefore, it is preferred that the resistance value R of the current-control resistance 25 be selected at an appropriate value.

Next, there will be described the operation of the driving apparatus 10 constructed as described above. First, the operator or user inputs or sets his or her desired target rotation speed of the electric motor 19, through the input device 22 having the target-speed volume. While the electric motor 19 is operating or rotating, the CPU 21a of the control device 21 compares the current rotation speed of the motor 19 detected by the speed sensor 23, with the preset target rotation speed input through the input device 22. Based on the comparison result, the CPU 21a produces the control command signal shown in FIG. 2(C). Additionally, based on this control command signal and the CF signal having the chopping frequency shown in FIG. 2(D), the CPU 21a generates the chopping signal shown in FIG. 2(E). As described previously, the chopping signal of FIG. 2(E) has such a characteristic that the chopping signal is held at the low-voltage state thereof for a time duration corresponding to a current voltage value (V) of the control command signal of FIG. 2(C) at the time of commencement of each low-voltage state of the CF signal of FIG. 2(D).

The CPU 21a supplies the chopping signal to the photocoupler 24, so that the LED 24a of the photocoupler 24 goes on and off according to the high- and low-voltage states of the chopping signal. Then, the phototransistor 24b of the photocoupler 24 conducts or stops the electric current in response to the going on and off of the LED 24a, respectively. Consequently the chopping element 18c directly chops the full-wave rectified output of the first rectifier 13 in response to the electric-current conducting and stopping of the phototransistor 24b.

When the chopping signal of FIG. 2(E) takes, for example, a low-voltage state, the LED 24a stops light emission, and the phototransistor 24b shuts off the electric current flowing therethrough, so that the 5 V direct current is applied to the gate G of the chopping element 18c through the previously mentioned path (A). As a result, an electric short takes place between a drain, D, and a source, S, of the chopper element 18c, and the voltage between the drain S and source S of the chopping element 18c takes a low-voltage state as shown in FIG. 2(F). Since the voltage applied to the electric motor 19 is obtained by subtracting the voltage waveform of FIG. 2(F) from the voltage waveform of FIG. 2(B), the full-wave rectified output of the first rectifier 13 is directly applied to the electric motor 19, in this situation.

On the other hand, when the chopping signal takes a high-voltage state, the LED 24a emits light, and the phototransistor 24b conducts the electric current, so that the direct current being applied to the gate G of the chopping element 18c drops from 5 V. As a result, no electric current flows between the drain D and source S of the chopping element 18c, and the voltage between the drain S and source S of the chopper element 18c takes a high-voltage state as shown in FIG. 2(F). In this situation, the voltage waveform of FIG. 2(F) is identical with the voltage waveform of FIG. 2(B) as the full-wave rectified output of the first rectifier 13. Therefore, no electric current is applied to the electric motor 19.

Thus, the chopper 18 chops the full-wave rectified output of the first rectifier 13 according to the chopping signal generated by the control device 21 and transmitted by the photocoupler 24, so that the electric motor 19 operates or rotates under supply of the voltage waveform obtained by subtracting the waveform of FIG. 2(F) from the waveform of FIG. 2(B). FIG. 2(G) shows a waveform of an electric current flowing through the electric motor 19. The current waveform of FIG. 2(G) is appreciably similar to the control command signal of FIG. 2(C). Since the output torque of the universal motor 19 changes in proportion to the square of the electric current flowing therethrough, the current waveform of FIG. 2(G) generally represents the output torque of the electric motor 19.

In the present embodiment, the chopping signal of FIG. 2(E) has a high frequency of 20 KHz, so that the high frequency-switched (or -chopped) voltage waveform is applied to the electric motor 19. Thus, the output torque of the electric motor 19 enjoys a continuous and appreciably constant waveform indicated at solid line in FIG. 2(G), as compared with the intermittent and highly variable torque waveform of FIG. 5(E) produced by the electric motor 4 under control of the conventional driving apparatus shown in FIG. 4. Therefore, the present driving apparatus 10 largely reduces the vibration of the electric motor 19, thereby reducing the vibration of a framework of the sewing machine in which the electric motor 19 is accommodated, and reducing the noise audible by the operator or user. A test shows that, when a universal motor 19 is rotated at 110 rpm (rotations per minute) under control of the present apparatus 10, the detected noise level is 51 dB that is lower by as much as 6 dB than the 57 dB noise level detected from a universal motor operated under control of the conventional apparatus of FIG. 4.

In response to both the constant load changing (e.g., vertical reciprocation of the needle bar) and the abrupt load changing (e.g., sticking of the needle into or through the work sheet) on the sewing machine, the present driving apparatus 10 produces the control command signal of FIG. 2(C) and subsequently the chopping signal of FIG. 2(E), on a real-time basis, so that the chopper 18 effectively follows the chopping signal and the electric motor 19 quickly responds to each load changing on a real-time basis.

Figure 6:
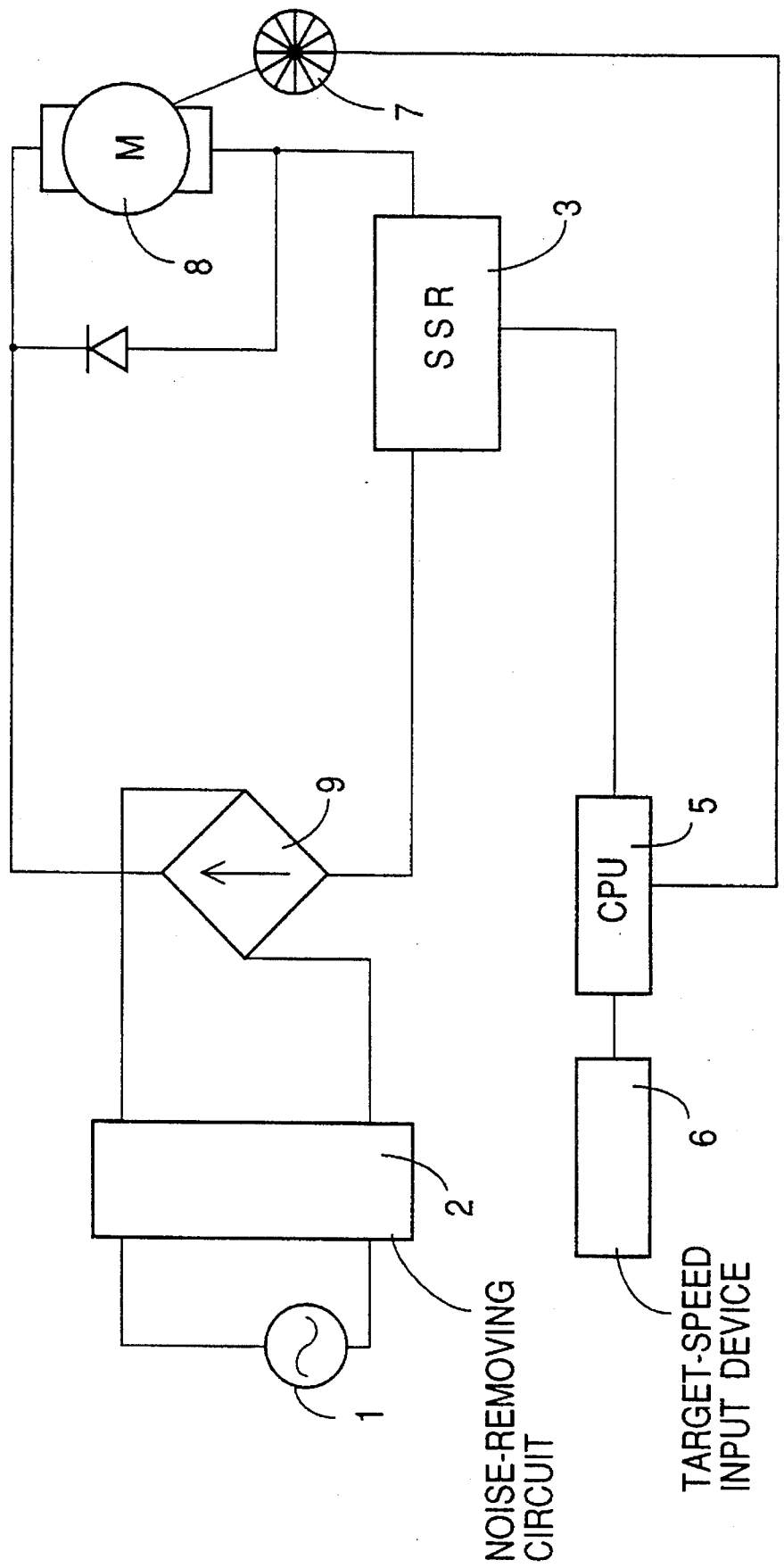
FIG. 6 is a view corresponding to FIG. 1, showing a second conventional driving apparatus.

Since neither a vibration absorber such as a rubber member nor an exclusive DC power supply is needed according to the present invention, the driving apparatus 10 is free from the conventionally encountered problems that the production cost is increased due to the employment of the vibration absorber and that both the overall size and the production cost are increased due to the employment of the exclusive DC power supply. Although it may be seen that the total number of parts of the driving apparatus 10 of FIG. 1 may be increased as compared with that of the conventional driving apparatus of FIG. 4 or FIG. 6, it is possible to reduce the number of the parts of the present apparatus 10. For example, the first and second rectifiers 13, 16 may be provided by a small single part or element, and the transformer 15 may be obtained by winding a coil around a transformer which is employed to operate the CPU 21a of the control device 21. Thus, there is substantially no increase in the number of parts of the driving apparatus 10 of FIG. 1 as compared with the conventional apparatus of FIG. 4 or FIG. 6.

As shown in FIG. 2(G), the electric current flowing through the electric motor 19 has a frequency component resulting from the chopping signal of FIG. 2(E), or the chopping frequency shown in FIG. 2(D). This frequency component can be minimized, and the vibration of the electric motor 19 resulting from this frequency component can effectively be reduced by maximizing the chopping frequency shown in FIG. 2(D). In view of this principle, it is experimentally found that a chopping signal having a not less than 10 KHz frequency is practically employable for the purpose of sufficiently reducing the vibration of a common sewing machine, because of the specific mechanical construction of the sewing machine. Further in view of the switching performance of the power MOS-FET used as the chopper element 18c, the present driving apparatus 10 uses the chopping signal with the 20 KHz frequency that exceeds the upper limit of the human audible frequency range, thereby effectively reducing the noise audible by the operator or user.

Figure 4:
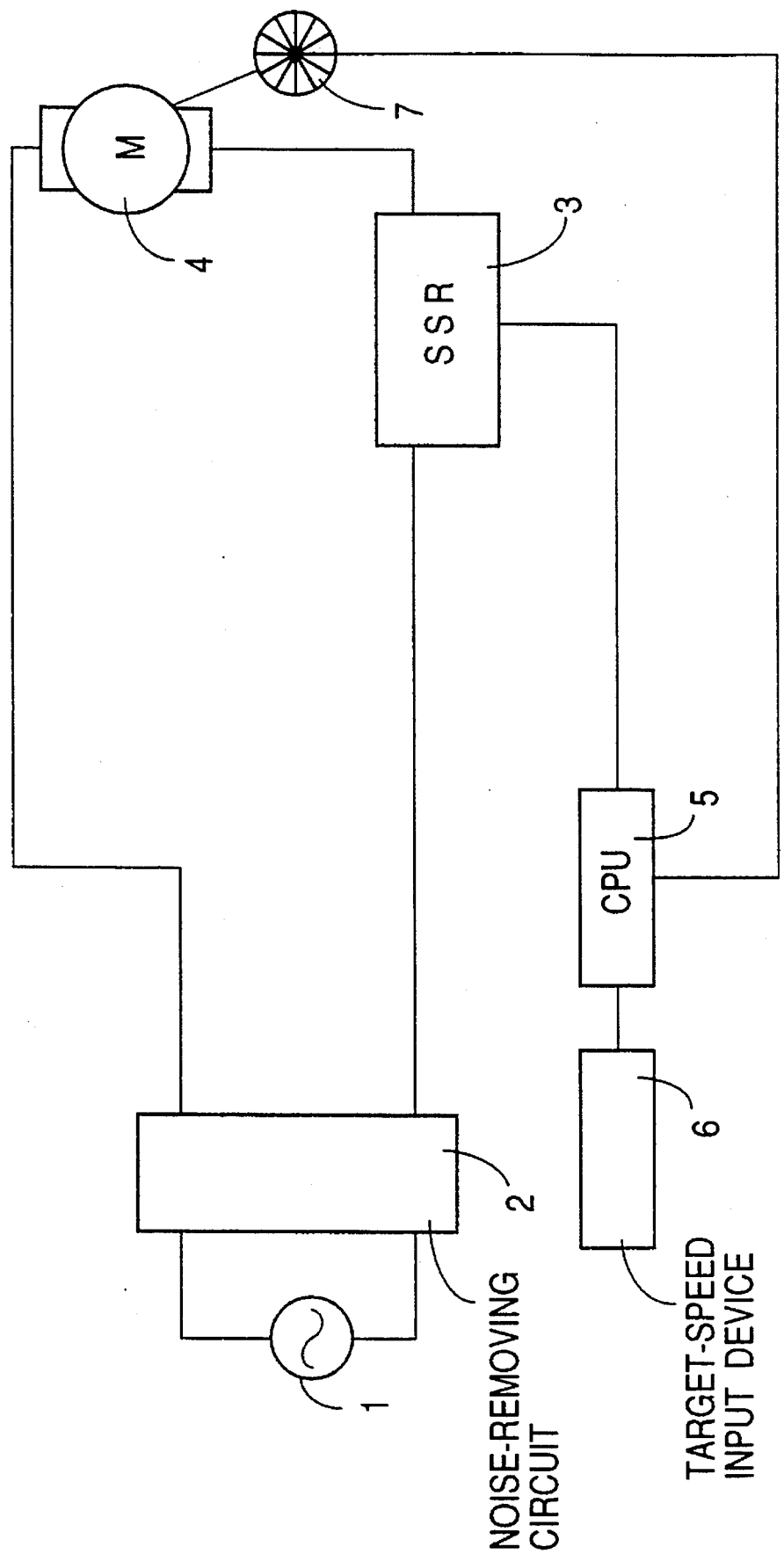
FIG. 4 is a view corresponding to FIG. 1, showing a first conventional control apparatus.
Figure 5:
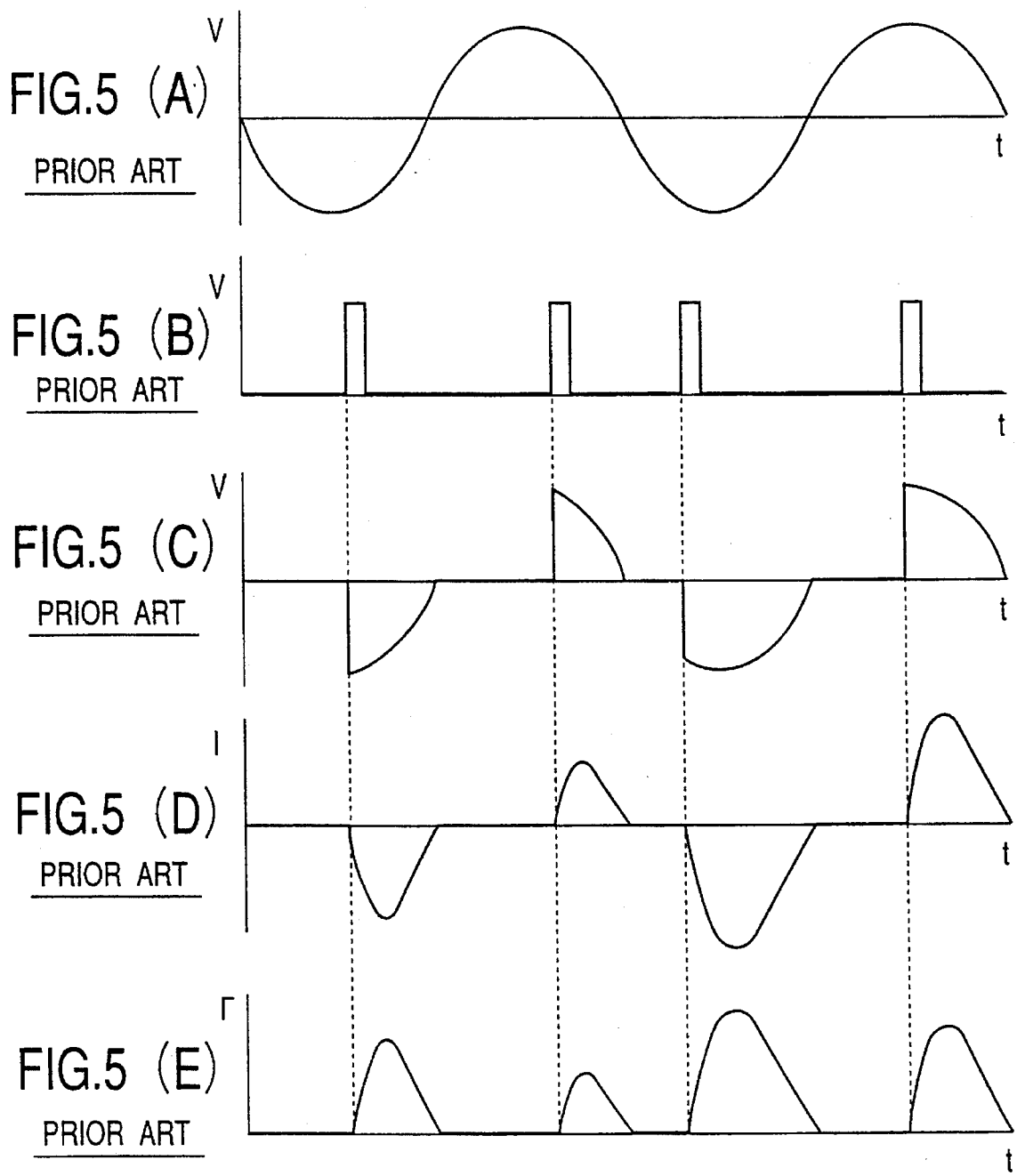
FIG. 5(A) is a graph corresponding to FIG. 2(A), showing a voltage waveform of an AC output of a commercially available AC power supply of the apparatus of FIG. 4.
FIG. 5(B) is a graph showing an ON signal supplied from a control device (i.e., CPU) to a solid-state relay in the apparatus of FIG. 4.
FIG. 5(C) is a graph showing a voltage waveform applied to an electric motor in the apparatus of FIG. 4.
FIG. 5(D) is a graph showing a waveform of an electric current flowing through the electric motor in the apparatus of FIG. 4.
FIG. 5(E) is a graph showing an intermittent output torque of the electric motor driven by the apparatus of FIG. 4.

In the conventional driving apparatus shown in FIG. 4, the solid-state relay 3 is employed for controlling the phase of voltage waveform applied to the universal motor 4 or 8, as shown in FIG. 5(C). When the CPU 5 applies, to the relay 3, an ON signal having a prescribed potential difference, $V_b$, with respect to a voltage, $V_a$, between the two terminals of the relay 3, the relay 3 carries out a switching operation. Thus, it is not required to electrically insulate the side of the CPU 5 and the side of the relay 3 from each other when the ON signal is applied to the relay 3. On the other hand, in the present embodiment wherein the power MOS-FET as the chopper element 18c carries out the switching operation, it is required to apply, to the gate, G, of the FET, a signal having a prescribed potential difference with respect to the potential of the source, S, of the FET (in the present embodiment, potential of the ground GND). To this end, the photocoupler 24 is used to transmit the chopping signal generated by the CPU 21a, to the chopper 18, under the condition that the CPU 21a and the chopper 18 are electrically insulated from each other. The stable output of the DC source 14 (having the voltage with the prescribed potential difference with respect to the potential of the source S) being applied to the gate G of the chopper element 18c is controlled according to the chopping signal thus transmitted to the chopper 18.

In addition to the function of transmitting the chopping signal to the chopper 18, the photocoupler 24 has another important function as described below. In the sewing machine, the ground GND on the secondary side thereof on which the control device 21 is provided, is connected to the framework thereof, in view of the problems of noise and static electricity, while one of supply terminals thereof for the AC supply 11 is earthed via a ground (GND) line. Since the control device 21 is electrically insulated by a transformer, the ground GND line of a secondary power source for the CPU 21a contacts the earth via the framework of the sewing machine, with no problem. However, if the photocoupler 24 is omitted, an electric short occurs because the ground GND line of the full-wave rectified output for driving the electric motor 19 contacts the earth by bypassing the transformer for the control device 21.

Figure 3:
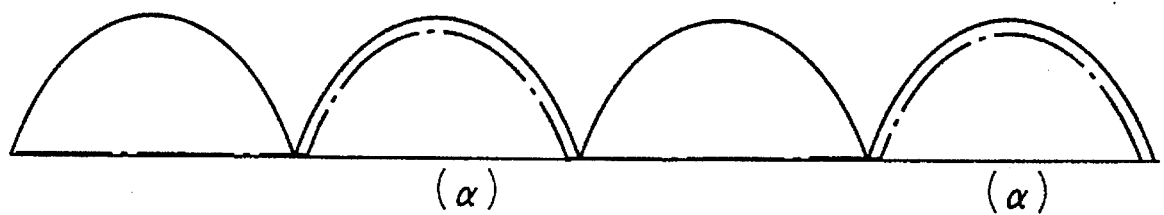
FIG. 3 is a graph showing the principle of occurrence of an electric-short hazard.

FIG. 3 shows the principle of occurrence of an electric-short hazard. The voltage level of the ground GND line of the full-wave rectified output (on the lines 13a, 16b, 16c) is indicated at solid line (i.e., base line), and the voltage level of the earthed supply terminal for the AC supply 11 is indicated at one-dot chain line. As is apparent from FIG. 3, if the ground GND line and the earth contact each other at a portion indicated at α in FIG. 3, an up to 141 V electric short occurs. In the present embodiment, however, the photocoupler 24 is employed to prevent the electric-short hazard. Thus, the present driving apparatus 10 enjoys high safety in addition to the above described advantages.

While the present invention has been described in its preferred embodiment, it is to be understood that the present invention may be otherwise embodied.

For example, while in the illustrated embodiment the 20 KHz chopping frequency is employed, the principle of the present invention is by no means limited to the specific chopping frequency. For the previously described reasons, it is possible to select an appropriate chopping frequency within a frequency range not less than 10 KHz. Our experiments show that it is preferable to select the chopping frequency within the 16 to 24 KHz frequency range, more preferably within the 17 to 23 frequency range, and most preferably within the 19 to 22 KHz frequency.

Although in the illustrated embodiment the power MOS-FET is used as the chopping element 18c, it is possible to use other sorts of chopping elements such as a power transistor and an IGBT (insulated gate bipolar transistor).

While in the illustrated embodiment an universal motor is used as the electric motor 19, it is possible to use other sorts of electric motors such as a DC motor or a DC brushless motor. That is, the present invention is applicable to any sort of electric motor whose rotation is controllable in accordance with a DC voltage. In particular, in the case where a DC motor is used as the electric motor 19, it is preferred to provide and connect a diode between and to the lines 13a and 13b in parallel to the DC motor 19. In this case, when a counter electromotive force is produced between the two ends of the electric motor 19 so that the drain voltage of the chopping element 18c is likely to exceed the voltage of the AC supply 11, the diode permits an electric current to flow therethrough, thereby effectively preventing such a counter electromotive force which exceeds the upper limit voltage which the chopping element 18c can withstand, from being applied to the chopping element 18c.

Although in the illustrated embodiment the stable DC power source 14 is provided by the transformer 15, the second rectifier 16, and the smoothing condenser 17, it is otherwise possible to employ a Zener diode, a resistance, a condenser, etc. for utilizing an output of the first rectifier 13 to provide a stable DC voltage to be applied to the chopping element 18c.

While in the illustrated embodiment the driving apparatus 10 is used for driving the electric motor 19 employed in a sewing machine, the principle of the present invention is widely applicable to drive various sorts of electric motors employed in various sorts of machines such as an electric tool (e.g., electric drill) or a household or home-use electric appliance (e.g., vacuum cleaner).

It is to be understood that the present invention may be embodied with other changes, improvements, and modifications that may occur to those skilled in the art without departing from the spirit and scope of the invention defined in the appended claims.

What is claimed is:

1. An apparatus for driving an electric motor according to a given control target, comprising:

a control circuit which generates a control command signal corresponding to said control target;

a chopping signal generator which generates a chopping signal based on said control command signal generated by said control circuit;

supply terminals which are connectable to an alternating-current power supply;

a full-wave rectifier which rectifies an alternating current supplied from said alternating-current power supply, and supplies a full-wave rectified current to said motor, said full-wave rectifier being connected to said supply terminals without any transformer being provided therebetween, and having output terminals one of which provides a first ground line;

a chopper which is connected in series to a series circuit including said motor and said full-wave rectifier and which chops said full-wave rectified current supplied to said motor according to said chopping a signal generated by said chopping signal generator;

an insulator-type signal transmitter which transmits said chopping signal to said chopper in a state in which said chopping signal generator is electrically insulated from the chopper;

said chopper comprising a direct-current power source which includes a first transformer having input terminals connected to said supply terminals, respectively, transforms said alternating current into a first transformed current, and produces a direct current from said first transformed current, said direct-current power source having output terminals one of which provides a second ground line connected to said first ground line of said full-wave rectifier, and outputting said direct current via said output terminals thereof, a direct-current control circuit which causes said direct current to change between a high voltage state thereof and a low voltage state thereof according to said chopping signal supplied from said chopping signal generator via said insulator-type signal transmitter, and a chopping element which is connected in series to said series circuit including said motor and said full-wave rectifier and which is selectively placed in an ON state thereof and an OFF state thereof according to said direct current which changes between said high and low voltage states thereof under control of said direct-current control circuit; and said chopping signal generator comprising a second transformer which has input terminals connected to said supply terminals, respectively, and has output terminals and which transforms said alternating current into a second transformed current and outputs said second transformed current via said output terminals thereof, a computer which is supplied with said second transformed current and which operates on a voltage of the second transformed current, and a third ground line connected to one of said output terminals of said second transformer, said third ground line being earthed.

2. An apparatus according to claim 1, wherein said chopping signal generator comprises means for generating said chopping signal having a frequency not lower than 10 KHz.

3. An apparatus according to claim 1, wherein said chopping signal generator comprises means for generating said chopping signal having a frequency of about 20 KHz.

4. An apparatus according to claim 1, wherein said chopping element comprises a field effect transistor.

5. An apparatus according to claim 1, wherein said first and second transformers comprise a primary winding and a core, and share said primary winding and said core with each other.

6. An apparatus according to claim 1, wherein said third ground line connected to said one of said output terminals of said second transformer is earthed via a framework of a machine employing said electric motor driven by the apparatus.

7. An apparatus according to claim 1, wherein said electric motor comprises a universal motor.

8. An apparatus according to claim 1, wherein said electric motor comprises a direct-current motor and wherein the apparatus further comprises a diode connected in parallel to said direct-current motor between a high-voltage-level terminal and a low-voltage-level terminal of the direct-current motor, said diode inhibiting a direct current from flowing therethrough in a first direction from a side of said high-voltage-level terminal toward a side of said low-voltage-level terminal, and permitting a direct current to flow therethrough in a second direction opposite to said first direction.

9. An apparatus for driving an electric motor according to a given control target, comprising:

a control circuit which generates a control command signal corresponding to said control target;

a chopping signal generator which generates a chopping signal based on said control command signal generated by said control circuit;

supply terminals which are connectable to an alternating-current power supply;

a full-wave rectifier which rectifies an alternating current supplied from said alternating-current power supply, and supplies a full-wave rectified current to said motor, said full-wave rectifier being connected to said supply terminals without any transformer being provided therebetween, and having output terminals one of which provides a first ground line;

a chopper which is connected in series to a series circuit including said motor and said full-wave rectifier and which chops said full-wave rectified current supplied to said motor according to said chopping signal generated by said chopping signal generator;

an insulator-type signal transmitter which transmits said chopping signal to said chopper in a state in which said chopping signal generator is electrically insulated from the chopper;

said chopper comprising:

a direct-current power source which includes a first transformer having input terminals connected to said supply terminals, respectively, transforms said alternating current into a first transformed current, and produces a direct current from said first transformed current, said direct-current power source having output terminals one of which provides a second ground line connected to said first ground line of said full-wave rectifier, and outputting said direct current via said output terminals thereof, a direct-current control circuit which causes said direct current to change between a high voltage state thereof and a low voltage state thereof according to said chopping signal supplied from said chopping signal generator via said insulator-type signal transmitter, and a chopping element which is connected in series to said series circuit including said motor and said full-wave rectifier and which is selectively placed in an ON state thereof and an OFF state thereof according to said direct current which changes between said high and low voltage states thereof under control of said direct-current control circuit;

said chopping signal generator comprising:

a second transformer which has input terminals connected to said supply terminals, respectively, and has output terminals and which transforms said alternating current into a second transformed current and outputs said second transformed current via said output terminals thereof, a computer which is supplied with said second transformed current and which operates on a voltage of the second transformed current, and a third ground line connected to one of said output terminals of said second transformer, said third ground line being earthed, and said insulator-type signal transmitter comprising a photocoupler including a light emitting diode connected to said chopping signal generator, and a phototransistor connected to said chopper.

10. An apparatus for driving an electric motor according to a given control target, comprising:

a control circuit which generates a control command signal corresponding to said control target;

a chopping signal generator which generates a chopping signal based on said control command signal generated by said control circuit;

supply terminals which are connectable to an alternating-current power supply;

a full-wave rectifier which rectifies an alternating current supplied from said alternating-current power supply, and supplies a full-wave rectified current to said motor, said full-wave rectifier being connected to said supply terminals without any transformer being provided therebetween;

a chopper which is connected in series to a series circuit including said motor and said full-wave rectifier and which chops said full-wave rectified current supplied to said motor according to said chopping signal generated by said chopping signal generator;

an insulator-type signal transmitter which transmits said chopping signal to said chopper in a state in which said chopping signal generator is electrically insulated from the chopper;

a transformer which has input terminals connected to said supply terminals, respectively, and transforms said alternating current into a transformed current, said transformer having output terminals and supplying, via said output terminals thereof, said transformed current to said control circuit and said chopping signal generator; and a ground line connected to one of said output terminals of said transformer, said ground line being earthed.

11. A sewing machine comprising:

an electric motor;

a driving device which drives said electric motor according to a given control target;

said driving device comprising:

a control circuit which generates a control command signal corresponding to said control target, a chopping signal generator which generates a chopping signal based on said control command signal generated by said control circuit, supply terminals which are connectable to an alternating-current power supply, a full-wave rectifier which rectifies an alternating current supplied from said alternating-current power supply, and supplies a full-wave rectified current to said motor, said full-wave rectifier being connected to said supply terminals without any transformer being provided therebetween, and having output terminals one of which provides a first ground line, a chopper which is connected in series to a series circuit including said motor and said full-wave rectifier and which chops said full-wave rectified current supplied to said motor according to said chopping signal generated by said chopping signal generator, and an insulator-type signal transmitter which transmits said chopping signal to said chopper in a state in which said chopping signal generator is electrically insulated from the chopper;

said chopper comprising:

a direct-current power source which includes a first transformer having input terminals connected to said supply terminals, respectively, transforms said alternating current into a first transformed current, and produces a direct current from said first transformed current, said direct-current power source having output terminals one of which provides a second ground line connected to said first ground line of said full-wave rectifier, and outputting said direct current via said output terminals thereof, a direct-current control circuit which causes said direct current to change between a high voltage state thereof and a low voltage state thereof according to said chopping signal supplied from said chopping signal generator via said insulator-type signal transmitter, and a chopping element which is connected in series to said series circuit including said motor and said full-wave rectifier and which is selectively placed in an ON state thereof and an OFF state thereof according to said direct current which changes between said high and low voltage states thereof under control of said direct-current control circuit; and said chopping signal generator comprising:

a second transformer which has input terminals connected to said supply terminals, respectively, and has output terminals and which transforms said alternating current into a second transformed current and outputs said second transformed current via said output terminals thereof, a computer which is supplied with said second transformed current and which operates on a voltage of the second transformed current, and a third ground line connected to one of said output terminals of said second transformer, said third ground line being earthed.

\* \* \* \* \*